(12) United States Patent  
Prakash et al.

(10) Patent No.: US 10,244,105 B2  
(45) Date of Patent: *Mar. 26, 2019

(54) METHODS AND SYSTEMS FOR REAL TIME DISPLAY OF CALLER LOCATION, PROFILE, AND TRUST RELATIONSHIP

(71) Applicant: INTEL CORPORATION, Santa Clara, CA (US)

(72) Inventors: Gyan Prakash, Beaverton, OR (US); Selim Aissi, Beaverton, OR (US); Saurabh Dadu, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/091,768

(22) Filed: Apr. 6, 2016

(65) Prior Publication Data

US 2017/0070609 A1     Mar. 9, 2017

Related U.S. Application Data

(63) Continuation of application No. 12/627,839, filed on Nov. 30, 2009, now Pat. No. 9,338,286.

(51) Int. Cl.
| | |
|---|---|
| *H04M 1/56* | (2006.01) |
| *H04M 3/42* | (2006.01) |
| *H04L 12/58* | (2006.01) |
| *H04L 29/08* | (2006.01) |
| *H04M 1/57* | (2006.01) |

(Continued)

(52) U.S. Cl.
CPC ........ *H04M 3/42042* (2013.01); *H04L 51/32* (2013.01); *H04L 67/306* (2013.01); *H04M 1/575* (2013.01); *H04W 4/025* (2013.01); *H04W 12/06* (2013.01); *H04L 51/12* (2013.01); *H04L 51/20* (2013.01); *H04M 2203/60* (2013.01); *H04M 2203/655* (2013.01); *H04M 2242/30* (2013.01)

(58) Field of Classification Search
CPC ............... H04L 12/2803; H04L 12/581; H04L 29/06027; H04L 51/04; H04L 65/1006; H04L 65/1033; H04L 65/1069
USPC ................................ 379/88.01–88.19, 142.1
See application file for complete search history.

(56) References Cited

U.S. PATENT DOCUMENTS

| | | | |
|---|---|---|---|
| 7,876,744 B2* | 1/2011 | Kwon | H04M 15/00 370/353 |
| 2005/0249196 A1* | 11/2005 | Ansari | H04L 12/2803 370/352 |
| 2008/0152097 A1 | 6/2008 | Kent | |

(Continued)

OTHER PUBLICATIONS

Office Action dated Jan. 24, 2017 for European Application No. 10251627.5, 5 pages.

*Primary Examiner* — Solomon G Bezuayehu  
(74) *Attorney, Agent, or Firm* — Schwabe, Williamson & Wyatt, P.C.

(57) ABSTRACT

Methods and systems to display, in real time, detailed attribute information regarding a calling party. This information may be presented to a user in conjunction with an incoming voice-call or message on the user's smartphone/mobile internet device (MID) or other mobile device. Such information can help him/her in real-time to decide whether to respond to the communication. Attribute information is collected at a caller attributes processing server and communicated to a receiver device of the called party.

14 Claims, 5 Drawing Sheets

(51) Int. Cl.
 *H04W 4/02* (2018.01)
 *H04W 12/06* (2009.01)

(56) References Cited

U.S. PATENT DOCUMENTS

| | | | |
|---|---|---|---|
| 2009/0052422 A1* | 2/2009 | Kim | H04W 4/02 |
| | | | 370/338 |
| 2009/0086720 A1 | 4/2009 | Westlake | |
| 2009/0186629 A1* | 7/2009 | Soelberg | H04M 1/575 |
| | | | 455/456.1 |

* cited by examiner

METHODS AND SYSTEMS FOR REAL TIME DISPLAY OF CALLER LOCATION, PROFILE, AND TRUST RELATIONSHIP

CROSS REFERENCE TO RELATED APPLICATIONS

This application is a continuation of prior U.S. application Ser. No. 12/627,839, filed on Nov. 30, 2009.

BACKGROUND

When a telephone user receives an incoming call, the user knows little about the caller. Caller ID represents a partial solution, inasmuch as a user can now know the name and/or telephone number of a calling party. For some users this may be sufficient. For other users, e.g., those who receive a large volume of calls and perhaps transact significant business over their telephones, this may not be adequate.

Some incoming calls are more valuable than others. Some calls represent potential business or other urgent communications. Other calls may be important but are less urgent. Still other calls may have little or no value or significance to the user. Some calls in the latter category may even represent nuisances that represent a waste of the user's time and communications bandwidth.

BRIEF DESCRIPTION OF THE DRAWINGS/FIGURES

In the drawings, the leftmost digit(s) of a reference number identifies the drawing in which the reference number first appears.

DETAILED DESCRIPTION

Disclosed herein are methods and systems to display, in real time, attribute information regarding a calling party. This information may be presented to a user in conjunction with an incoming voice call or message (e.g., instant messaging (IM), short message service (SMS), or multi-media messaging service (MMS), etc.) on the user's smartphone/mobile internet device (MID) or other mobile device. Such information can help him/her to decide in real-time whether to respond to the communication. In currently existing mechanisms and services, only the caller's phone number and/or name (in so-called "caller ID" systems) are displayed.

In an embodiment, the displayed attributes may include:
caller's location
professional information collected from the caller's on-line social/professional networking services (e.g., selected information from a publicly available LinkedIn profile and/or Facebook profile)
trust relationship between the caller and the receiving party, based on receiver's friends list from social/professional networking services, information about the caller on the receiver's address book, and/or other policies that may be stored on the Smartphone/MID.

In an embodiment, the format and type of information displayed can be configured by the receiving party locally on his/her smartphone or other mobile computing device.

Figure 1:
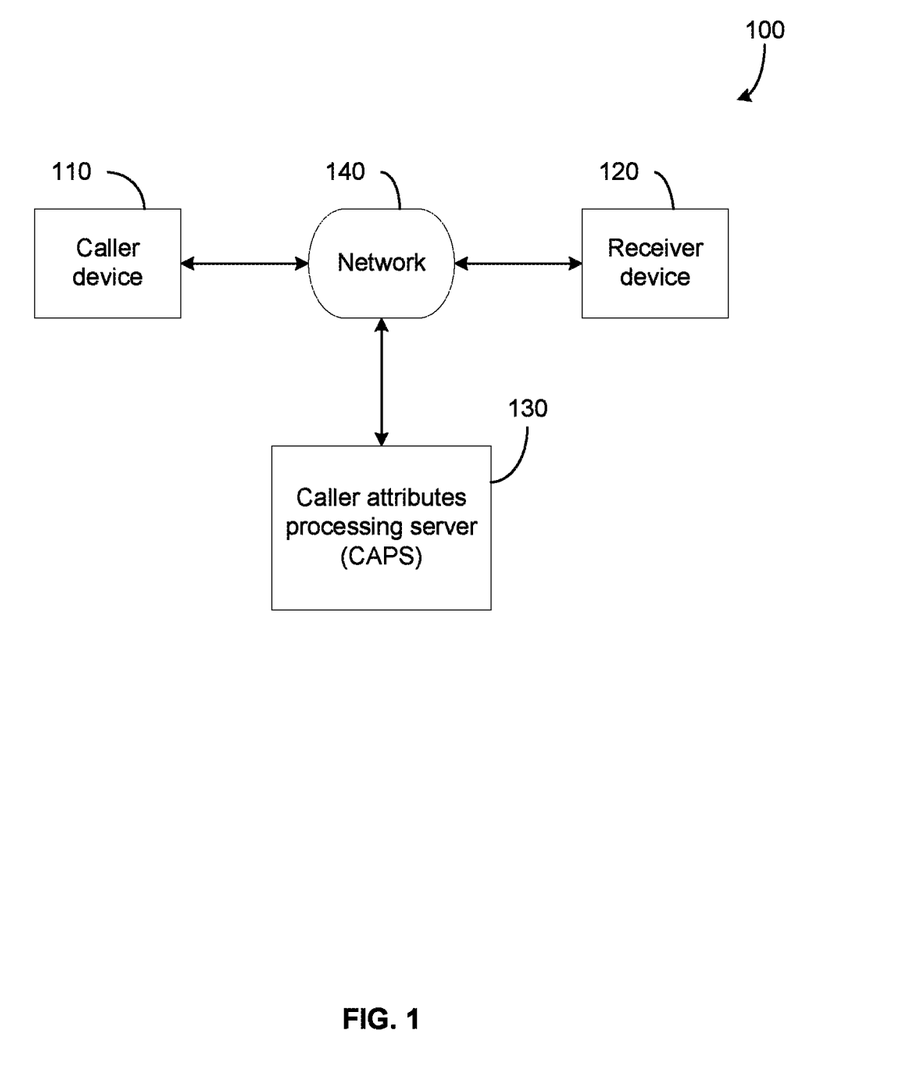
FIG. 1 is a block diagram generally illustrating the system described herein, according to an embodiment.

FIG. 1 illustrates the components of the system, according to an embodiment. Note that such a system is not necessarily limited to the illustrated components. System 100 may include a caller device 110 and a receiver device 120. As noted above, these devices may be, for example, smartphones or other mobile internet devices. The caller device 110 and receiver device 120 may communicate with a server, shown in FIG. 1 as caller attribute processing server (CAPS) 130. In the embodiment illustrated, this communication takes place via a network 140. Network 140 may be any computer network. In an embodiment, network 140 may be the Internet, or some combination of the Internet, wide area networks, and local area networks.

Note that the party initiating the communication is referred to herein as the caller, and the communications device used by the caller is referred to herein as a caller device. Nonetheless it is to be understood that the communication may or may not be a traditional telephone call. The communication may be a text or multi-media message, as discussed above.

Figure 2:
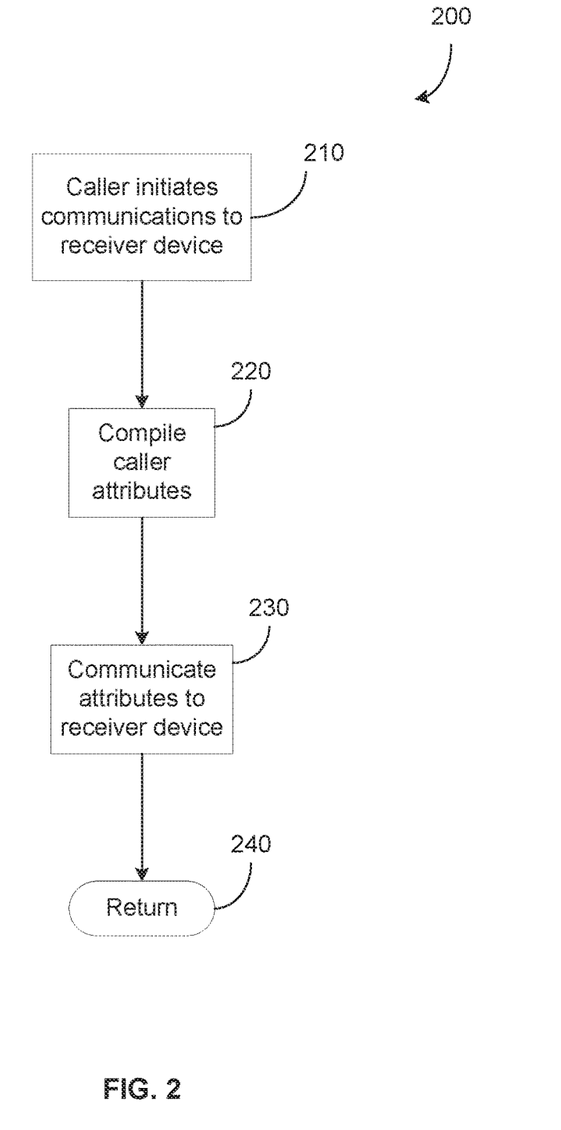
FIG. 2 is a flowchart generally illustrating the processing described herein, according to an embodiment.

The interaction between a caller device, a receiver device, and a CAPS is illustrated generally in FIG. 2 according to an embodiment. At 210, a caller device may place a call or otherwise initiate communications to a receiver device. At 220, a process of compiling the callers attributes takes place. As will be described in greater detail below, this compilation may be centered at the CAPS. The caller device may send information about its geographical location to the CAPS. The CAPS may also compile caller information on its own. Such data may include information about the party associated with the caller device, e.g., the registered owner of the device, presumed to be the caller. This information may include, for example, the employer of the caller and/or other professional affiliations. Such data may be amassed from publicly available sources, such as on-line social networking services for example. At 230, the compiled attributes of the caller may be communicated to the user of the receiver device, i.e., the party being called or receiving the message. The communicated attributes may include the caller's location, his professional affiliations, and/or mutual contacts, for example.

Note that in an embodiment, the communications between the caller device and the CAPS, as well as communications between the receiver device and the CAPS, take place through a data network such as the Internet for example. These communications paths may be separate from the channels that are otherwise used to establish and maintain voice communications between the caller and receiver devices. In an embodiment, the communications may take place over an out-of-band mechanism, such as SMS for example.

Figure 3:
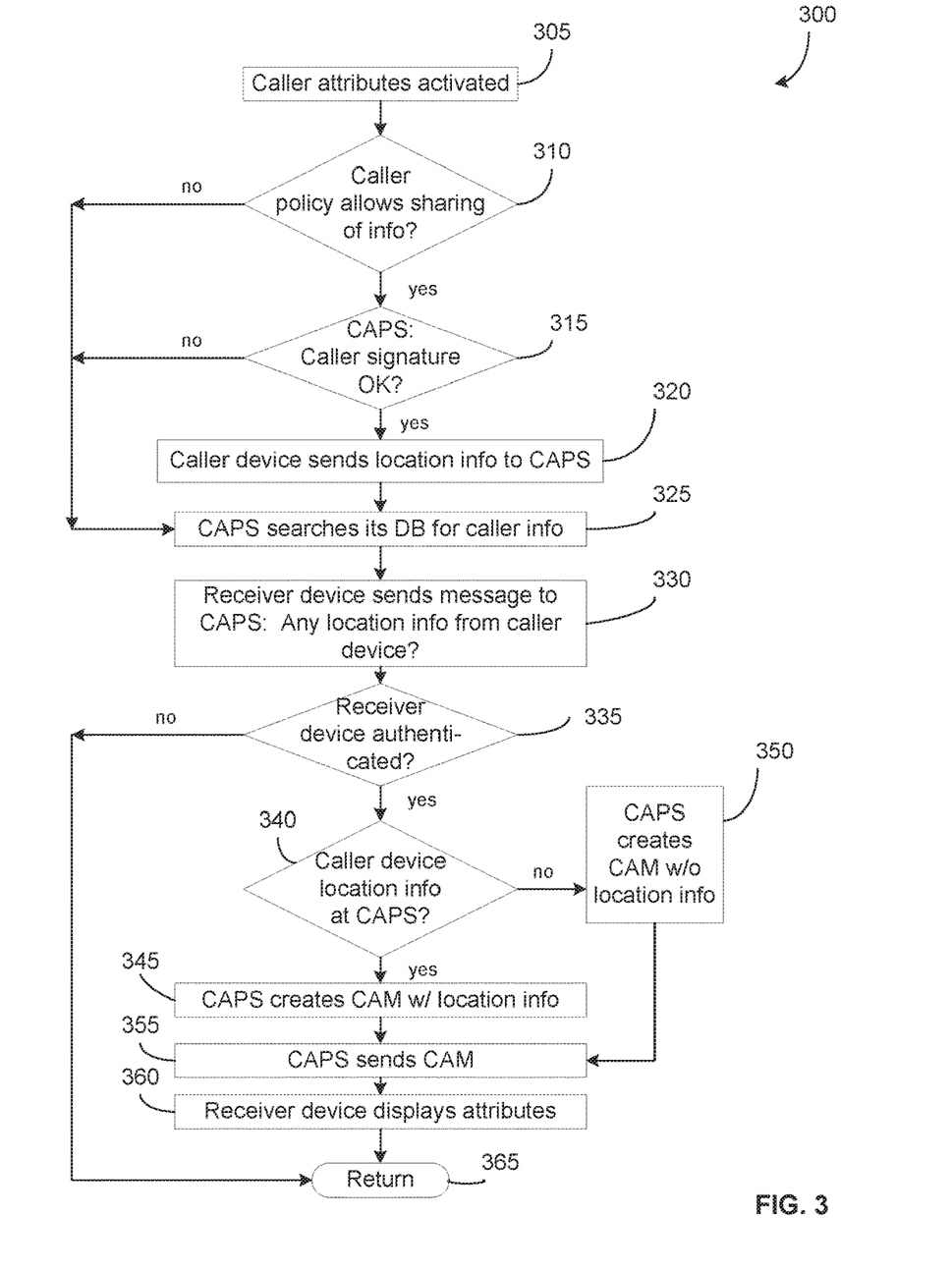
FIG. 3 is a flowchart illustrating in greater detail the process described herein, according to an embodiment.

An embodiment of the process is illustrated in greater detail in FIG. 3 as process 300. At 305, the process of compiling the caller device's attributes may be activated. At 310, a determination may be made at the caller device as to whether the sharing of its location information is permissible. Some devices, for example, may be configured to limit or prevent the sharing of information about the device for security reasons. Such limitations may be viewed abstractly as a security policy. At 310, the determination may be made as to whether the sharing of its location information is consistent with its security policy.

If this sharing is permitted, then at 315, the caller device and the CAPS may engage in an authentication process for security reasons. This would prevent a hacker or other unauthorized party from posing as the caller. In an embodiment, a digital signature may be passed from the caller device to the CAPS. Such a signature may use a public cryptography algorithm, for example, as would be well known to persons of ordinary skill in the art. At 315, the CAPS may attempt to verify the signature.

If the sharing of location information is permitted at 310 and the caller device is authenticated at 315, then the caller device sends its location information to the CAPS at 320. The caller device may ascertain its location in a number of ways. As discussed above, the location information may be sent via an out-of-band communications mechanism, such as SMS for example.

If so equipped, the caller device may take advantage of the global positioning system (GPS) in order to determine its location. Alternatively, the caller device may provide an internet protocol (IP) address for a server or router that it has used. Because such an address can be correlated to a geographical location, the IP address can represent an approximation of the physical location of the caller device. In addition, the location could be determined through a triangulation process involving known reference points. The location may also be based on the address registered for the caller device. This would be the case, for example, if the caller device is a PSTN telephone.

If either the sharing of location information is not permitted at 310 or the caller device is not authenticated at 315, then the caller device may not send its location information to the CAPS at 320.

At 325, the CAPS may collect other available information about the caller. This caller information may include information about the registered owner of the caller device. This information may include, but is not necessarily limited to, the person's name, his employer and title, his membership in professional, social, or volunteer organizations, and/or schools attended, for example. Such information may be obtained from public domain sources, such as profiles published by professional organizations, or social networking services such as Twitter, LinkedIn, Facebook, or MySpace for example. The use of social networking services as a source of information may also allow the CAPS to see if a caller is an immediate contact or friend of the receiving party, or if the caller is a friend of a friend, etc. This would allow the receiving party to see how closely connected the caller might be, and thus would suggest whether there is or should be any sort of trust relationship. In addition, the caller information may also be a means of conveying credentials or endorsements in a sales or other business context. The caller information may include references or recommendations from past contacts of the caller, as could be obtained through LinkedIn, for example.

In the illustrated embodiment, this information may have been collected previously and stored at the CAPS in one or more databases (DB) or other accessible data structure(s). In this case, 325 may represent a search of such a database in the CAPS. In an embodiment, data stored at the CAPS regarding the caller may be updated periodically or aperiodically by subsequently searching social networking services and/or other information sources.

At 330, the receiver device may send a message to the CAPS, inquiring as to whether location information has been received by the CAPS. If, for example, the security policy of the caller device prohibits the sharing of location information at 310, no location information will have been sent to the CAPS by the caller device. Likewise, if the authentication of 315 fails, no location information will have been accepted from the caller device by the CAPS. In an embodiment, the message sent from the receiver device to the CAPS includes the number of the caller device.

At 335, an authentication process for the receiver device may take place. Here, a determination may be made as to whether the receiver device may be an imposter, e.g., a hacker or other unauthorized party. In an embodiment, a digital signature may be presented by the receiver device and verification of the signature may be attempted at the CAPS. If the authentication fails, the process may conclude at 365. If the authentication succeeds, the process may continue at 340.

Here, a determination may be made as to whether the location information of the caller device is present at the CAPS. If so, the process may continue at 345, where the CAPS may construct a caller attributes message (CAM). In the event that the security policy of the caller device permits sharing of location information at 310 and the verification of the caller device's signature is successful at 315, the CAM constructed at 345 may include the location information, in addition to the caller information discussed above. In the event that the location information of the caller device is not present at the CAPS, then the process continues at 350, where the CAM may be constructed without the location information.

At 355, the CAM may be sent to the receiver device. At 360, the contents of the CAM, i.e., the caller information with or without the location information, may be displayed at the receiver device. The process concludes at 365.

Note that in an embodiment, the user of the receiver device may also provide input to the CAPS as to the kinds of information that is desired in order to make decisions about whether to accept or reject a call. A user may specify, for example, that employer information is not relevant, or that location information is relevant. This would allow the CAPS to filter the kinds of information that it obtains and/or sends to the user.

In an embodiment, the receiver device may also display information about the caller that is stored locally at the receiver device. Such information could include a stored address book entry. The presence or absence of an address book entry may further inform the user of the receiver device as to whether the caller is a trusted party.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 4:
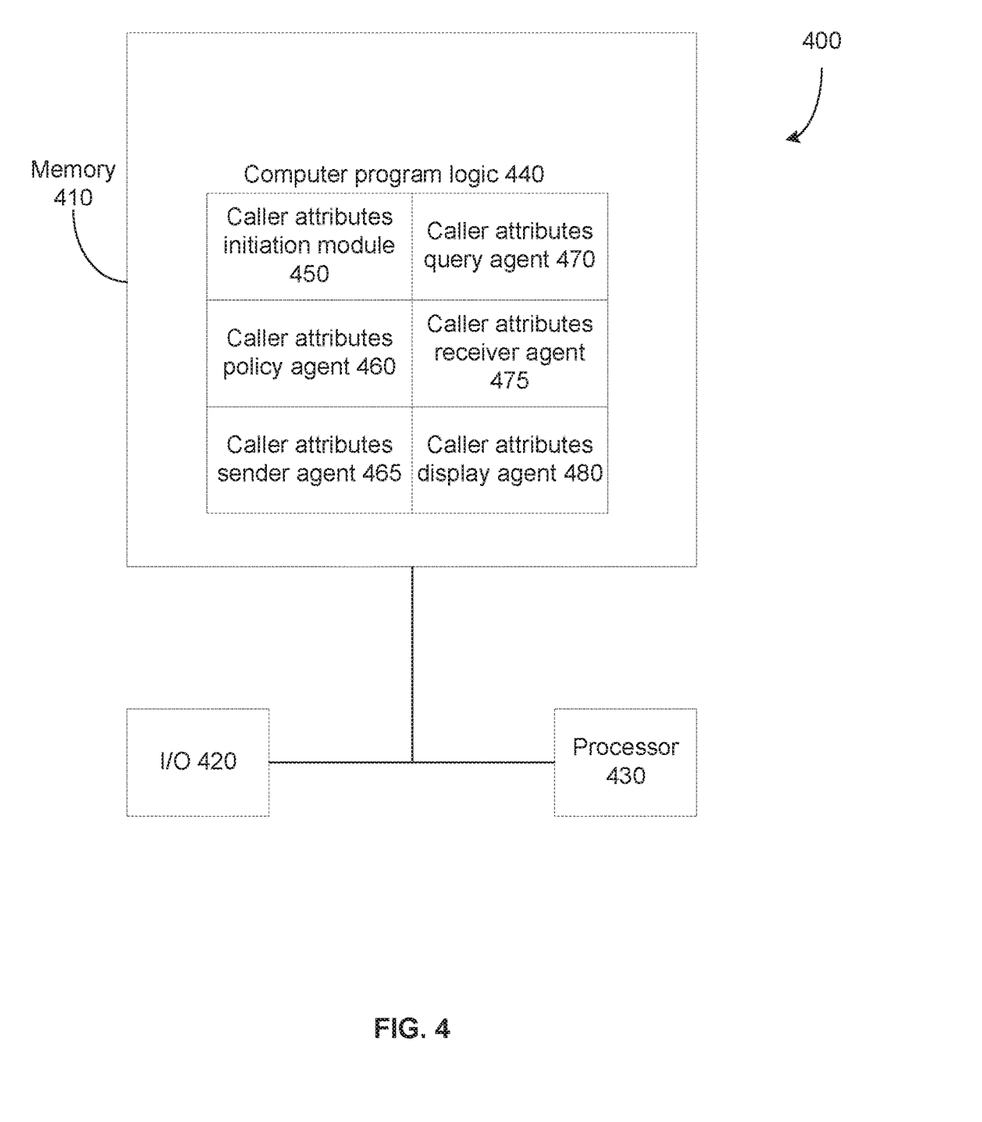
FIG. 4 is a block diagram illustrating software components in a communications device, in an embodiment.

In an embodiment the functionality of a caller device and a receiver device may be present in a single end user device, such as a smartphone or other mobile internet device for example. An appropriately configured device may therefore be a caller device or a receiver device, depending on the situation. An exemplary embodiment is shown in FIG. 4. System 400 of this figure illustrates software or firmware modules implemented in conjunction with a programmable device, although such a system is not necessarily limited to the illustrated modules. System 400 includes one or more memory devices 410 in communication with a programmable processor 430. Both memory 410 and processor 430 are in communication with one or more input/output devices or ports, shown collectively as I/O 420. In alternative embodiments, such a system is not necessarily limited to these components.

Memory 410 may include both instructions executable by processor 430, and related data. Memory 410 may be implemented on a computer readable medium, as would be understood to a person of ordinary skill in the art. Such a medium may be, for example and without limitation, a non-volatile memory device, a hard drive, a compact disk that may be read by a compact disk drive, an integrated circuit, or other machine-readable memory device.

In the illustrated embodiment, executable instructions in memory 410 are shown as computer program logic 440. The instructions in logic 440 may cause processor 430 to perform one or more functions in response thereto. Logic 440 may include a caller attributes initiation (CAI) module 450, a caller attributes policy agent (CAPA) 460, and a caller attributes sender agent (CASA) 465. These three modules may represent some the functionality described above with respect to a caller device.

CAI module 450 may be responsible for communicating with the caller attributes processing server at the initiation of a call at 305 in process 300. This may serve to inform the server that process 300 is to begin.

CAPA 460 may serve to determine whether the location information of the caller device may be shared with the caller attributes processing server and the receiver device. In an embodiment, CAPA 460 may compare the parameters of this prospective information transfer with the conditions specified in the security policy. The security policy may specify, for example, the acceptable conditions for information transfers, e.g., the information that may be transferred, the parties or entities that may receive the information, and the conditions under which the transfer may take place, such as the time, the ports to be used, etc.

CASA 465 may be responsible for sending location information from the caller device to the caller attributes processing server. As discussed above, this information may have been derived from a GPS, or may take the form of an IP address used by the caller device. Known technologies using triangulation may also be used. The sending of location information is contingent on the permissions defined by the security policy.

Logic 440 may also include a caller attributes query agent 470, a caller attributes receiver agent 475, and a caller attributes display agent 480. These three modules may represent some of the functionality described above with respect to a receiver device.

The caller attributes query agent 470 may be responsible for contacting the caller attributes processing server upon receipt of an incoming call. For example, this module may query the call attributes processing server as to whether the location information of the caller device is present at the server, as discussed above with respect to FIG. 3.

The caller attributes receiving agent 475 may be responsible for receiving a caller attributes message from the caller attributes processing server. The caller attributes display agent 480 may then be responsible for then presenting caller attributes to a user in a particular manner. The presentation of this information may take place using particular graphics and or audio cues. In an embodiment, the presentation may be tailored by a user of the receiving device, who may choose to see certain elements of the caller attributes before other elements, for example, or may choose to see elements of the caller attributes at particular times during the call process. In an embodiment, the user may configure the number of rings that are heard before the presentation of the caller attributes. Configuration of such a presentation may be managed by the caller attributes display agent 480.

In an embodiment, the system and processing described here may be used when a caller is contacted by a prospective service provider or other vendor. Here, it may be useful for the caller to receive information about the service provider's past work, e.g., recommendations, endorsements, or criticisms from previous customers. In an embodiment, such information may be collected by the CAPS from publicly available information services such as angieslist.com or servicemagic.com for example. Such information may be provided to a receiver device even after a call has been accepted.

Figure 5:
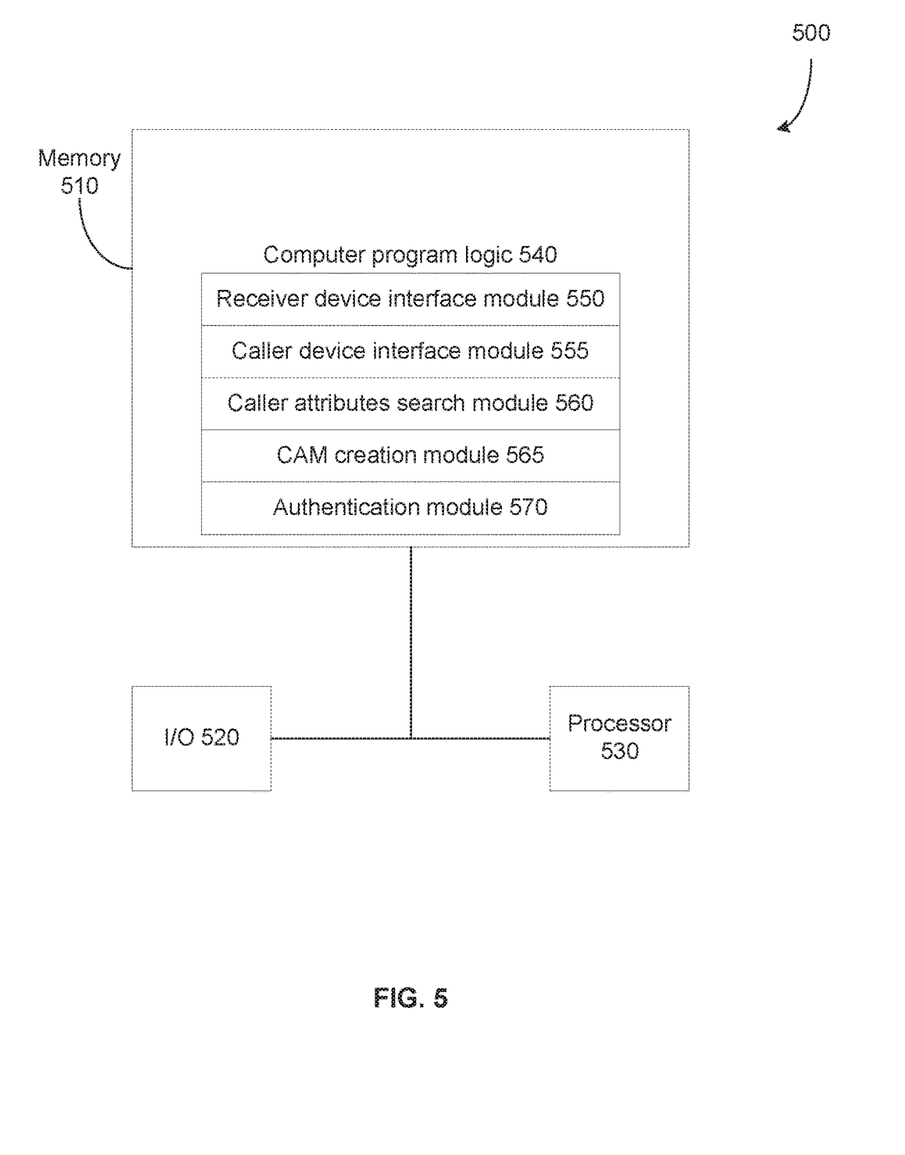
FIG. 5 is a block diagram illustrating software components in a caller attributes processing server, in an embodiment.

The system and processes described above with respect to the caller attributes processing server may also be embodied in hardware, software, firmware, or in a combination thereof. An exemplary embodiment is shown in FIG. 5. System 500 of this figure illustrates software or firmware modules implemented in conjunction with a programmable device. System 500 includes one or more memory devices 510 in communication with a programmable processor 530. Both memory 510 and processor 530 are in communication with one or more input/output devices or ports, shown collectively as I/O 520. Note that such a system is not necessarily limited to the components shown.

Memory 510 may include both instructions executable by processor 530 and related data. Memory 510 may be implemented on a computer readable medium, as would be understood to a person of ordinary skill in the art. Such a medium may be, for example and without limitation, a non-volatile memory device, a hard drive, a compact disk that may be read by a compact disk drive, an integrated circuit, or other machine-readable memory device.

In the illustrated embodiment, executable instructions in memory 510 are shown as computer program logic 540. The instructions in logic 540 may cause processor 530 to perform one or more functions in response thereto. In alternative embodiments, logic 540 is not necessarily limited to the illustrated modules.

Logic 540 may include interface modules for communications with the receiver device (module 550) and for communications with the caller device (module 555). These modules manage communications between the caller attributes processing server and each of these respective user devices.

Logic 540 may also include a caller attributes search module 560. In an embodiment, this module is responsible for identifying the caller information, i.e., attributes of a caller apart from any location information that the caller device may provide. As discussed above, this process may include a search of one or more databases at the caller attributes processing server. The search may be based on the number of the caller device and/or the name of the person associated with the device.

Logic 540 may also include a caller attributes message (CAM) creation module 565. This module may be responsible for creation of the caller attributes message, based on information obtained in the search of local databases and any available location information from the caller device.

Logic 540 may also include an authentication module 570. This module may be responsible for authenticating communications with the caller and receiver devices. In an embodiment, this may include the verification of digital signatures provided by these devices for security purposes.

In alternative embodiments, logic 540 is not necessarily limited to the illustrated modules.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method for operating a caller device, comprising:
placing a call, by the caller device, to a receiver device, via one or more networks of a combination of networks that communicatively couples the caller device and the receiver device;
determining, by the caller device, whether sending of available location information of the caller device to a caller attributing processing (CAP) server is consistent with a security policy, wherein the CAP server processes caller attributes and does not play any role in establishing the call between the caller device and the receiver device;
on determining that sending of the available location information of the caller device to the CAP server is consistent with the security policy, sending to the server, by the caller device, the available location information, wherein in response to receipt of the available location information of the caller device, the CAP server sends a caller attributes message from the CAP server to the receiver device, via another one or more networks of the combination of networks, on behalf of the caller device, the CAP server being also coupled to the combination of networks;
wherein the caller attributes message include caller information associated with a caller of the caller device, and a trust relationship between the caller and a receiving party of the receiver device collected by the CAP server; and
wherein the CAP server collects the trust relationship based at least in part on policies on the receiver device.

2. The method of claim 1, further comprising:
the caller device authenticating itself to the CAP server, performed prior to the sending of the available location information at the CAP server.

3. The method of claim 1, wherein the CAP server collects at least a portion of the caller information from one or more social networks; and wherein the CAP server further collects the trust relationship based at least in part on the receiving party's friend list on a social network where members of the social network share multi-media content, the receiving party's friend list on a professional networking service where members of the professional networking service share professional information, information about the caller on the receiving party's address book.

4. The method of claim 1, wherein the CAP server stores at least a portion of the caller information at the CAP server, and updates the portion of the caller information periodically.

5. The method of claim 1, wherein the caller device comprises a mobile internet device.

6. The method of claim 1, wherein the location information is based on at least one of:
a position of the caller device as determined by a global positioning system, and
an internet protocol address used by the caller device.

7. A caller device, comprising:
a processor; and
a memory to store instructions that direct said processor to:
place a call to a receiver device via one or more networks of a combination of networks that communicatively couples the caller device and the receiver device;
determine whether sending of available location information of the caller device to a caller attribute processing (CAP) server is consistent with a security policy, wherein the CAP server processes caller attributes and does not play any role in establishing the call between the caller device and the receiver device;
on determination that sending of the available location information of the caller device to the server is consistent with the security policy, send the available location information of the caller device from the caller device to the CAP server, wherein in response to receipt of the available caller information, the CAP server sends a caller attributes message from the CAP server to the receiver device, via another one or more networks of the combination of networks, on behalf of the caller device, the CAP server being also coupled to the combination of networks;
wherein the caller attributes message include caller information associated with a caller of the caller device, and a trust relationship between the caller and a receiving party of the receiver device collected by the CAP server;
wherein the CAP server collects the trust relationship based at least in part on policies on the receiver device.

8. The caller device of claim 7, wherein said instructions further direct said processor to authenticate the caller device to the server.

9. The caller device of claim 7, wherein the CAP server collects said caller information from one or more social networks; and wherein the CAP server further collects the trust relationship based at least in part on the receiving party's friend list on a social network where members of the social network share multi-media content, the receiving party's friend list on a professional networking service where members of the professional networking service share professional information, information about the caller on the receiving party's address book.

10. The caller device of claim 7, wherein the CAP server further
stores at least a portion of said caller information locally at the CAP server; and
updates said caller information periodically.

11. The caller device of claim 7, wherein said caller device comprises a mobile internet device.

12. The caller device of claim 7, wherein the location information of the caller device is based on at least one of:
a position of said caller device as determined by a global positioning system; and
an internet protocol address used by said caller device.

13. A mobile device, comprising:
a processor; and
a memory to store instructions that direct said processor to:
receive a call from a caller via a caller device of the caller, and one or more networks of a combination of networks that communicatively couples the mobile device and the caller device;

receive from a caller attribute processing (CAP) server, via another one or more networks of the combination of networks, a caller attributes message about the caller, the CAP server being coupled to the combination of networks, wherein the CAP server processes caller attributes and does not play any role in establishing the call between the caller device and a receiver device, and wherein the CAP server sends the caller attributes message in response to receipt of available location information of the caller device; and display the caller attributes message about the caller;
   wherein the caller attributes message includes the available location information and caller information of the caller, and a trust relationship between a receiving party of the mobile device and the caller; and
   wherein the CAP server collects the trust relationship based at least in part on policies on the mobile device.

14. A method for operating a mobile device, comprising:
receiving, by the mobile device, a call from a caller via a caller device of the caller and one or more networks of a combination of networks that communicatively couples the mobile device and the caller device;

receiving, by the mobile device, from a caller attribute processing (CAP) server, via another one or more networks of the combination of networks, a caller attributes message about the caller, the CAP server being coupled to the combination of networks, wherein the CAP server processes caller attributes and does not play any role in establishing the call between the caller device and a receiver device, and wherein the CAP server sends the caller attributes message in response to receipt of available location information of the caller device; wherein the available location information is sent from the caller device to the CAP server if the sending is consistent with the caller device's security policy;

. . . . displaying, by the mobile device, the caller attributes message about the caller;

wherein the caller attributes message includes the available location information and caller information of the caller, and a trust relationship between a receiving party of the mobile device and the caller; and wherein the CAP server collects the trust relationship based at least in part on policies on the mobile device.

\* \* \* \* \*